United States Patent [19]
Kirchner et al.

[11] 3,887,524
[45] June 3, 1975

[54] METHOD OF STRENGTHENING ALUMINA CERAMIC BY QUENCHING WITH LIQUID MEDIUM

[76] Inventors: Henry P. Kirchner, 700 S. Sparks St., State College, Pa. 16801; Ralph E. Walker, Beaver Rd., Julian, Pa. 16844

[22] Filed: Dec. 20, 1972

[21] Appl. No.: 316,696

Related U.S. Application Data

[63] Continuation-in-part of Ser. No. 131,595, April 6, 1971, abandoned.

[52] U.S. Cl. .................. 264/66; 264/67; 264/346; 264/348
[51] Int. Cl. ............................................ B28b 11/00
[58] Field of Search ......... 264/65, 66, 67, 346, 348, 264/237, 235

[56] References Cited
UNITED STATES PATENTS
3,712,830  1/1973  Kirchner .............................. 264/66

OTHER PUBLICATIONS
H. P. Kirchner et al., "Strengthening Alumina by Glazing and Quenching" Sept., 1968, Ceramic Bulletin at 798–802.
C. J. Phillips et al., "Thermal Conditioning of Ceramic Materials," Jan., 1964, Ceramic Bulletin at 6–8.

Primary Examiner—Robert F. White
Assistant Examiner—Gene Auville
Attorney, Agent, or Firm—Wenderoth, Lind & Ponack

[57] ABSTRACT

A method of strengthening a polycrystalline alumina ceramic. A body of alumina ceramic is refired to a temperature of from 1400°C to between 1700° and 1750°C for a time sufficient to heat the body to be strengthened throughout. The body is then quenched with a liquid medium which is at a temperature below about 250°C and which is a medium taken from the group consisting of oils having a viscosity as low as 1.4 centistokes, emulsions of oils in water with as little as 10% by weight of oil, triethanolamine, and mixtures of emulsifier and water. A strengthened body is produced which has improved flexural strength, tensile strength, impact resistance and thermal shock resistance.

18 Claims, 10 Drawing Figures

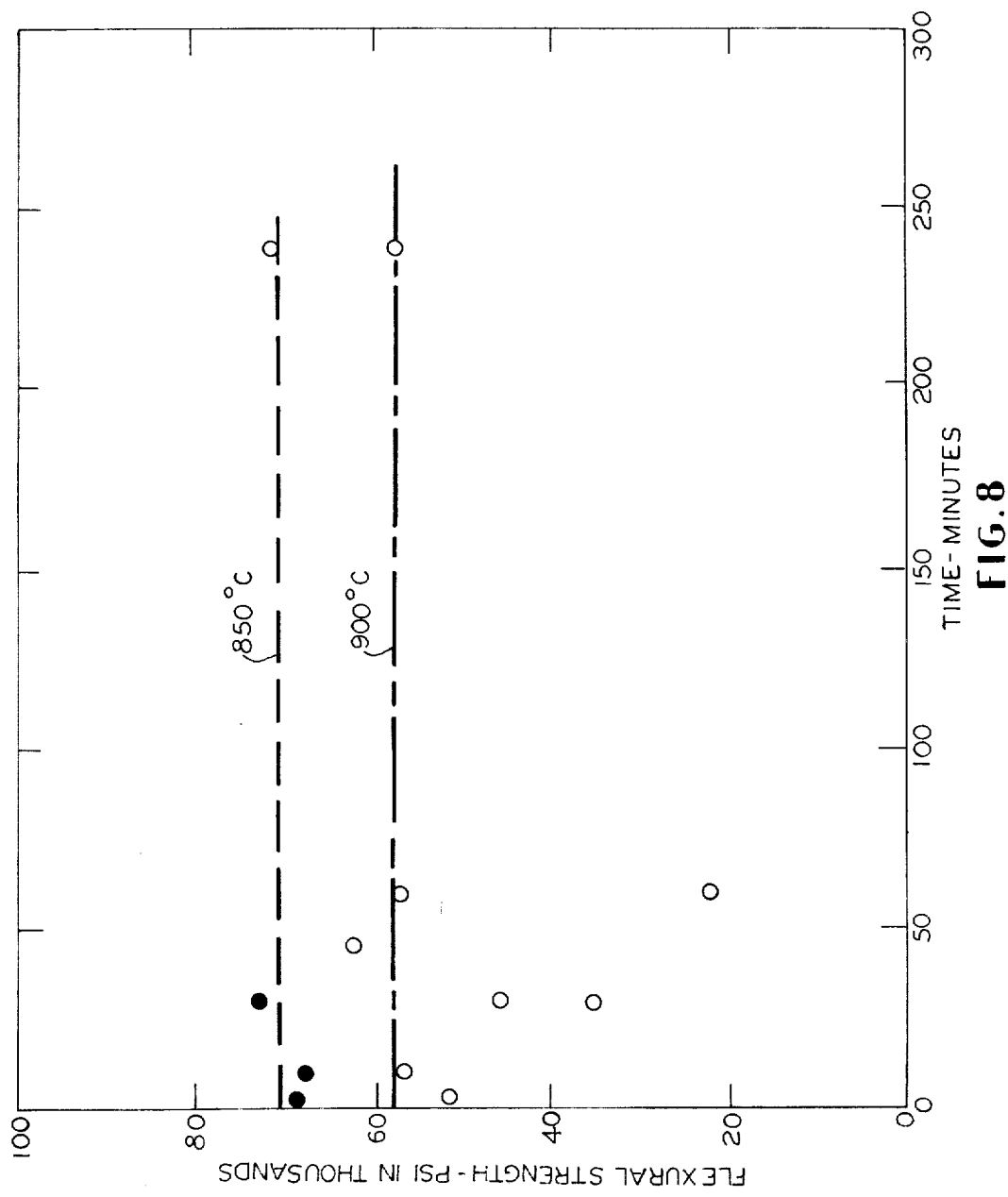

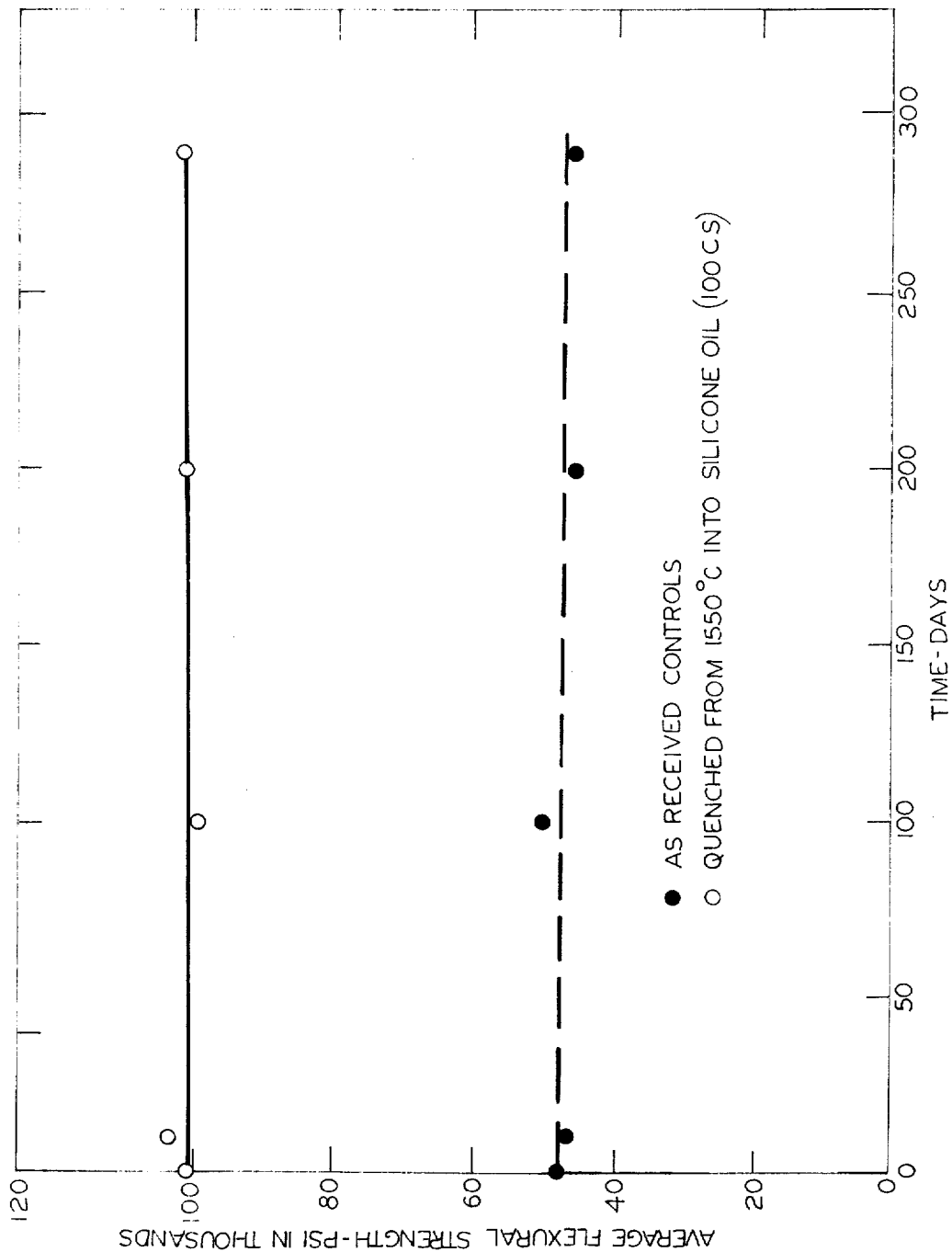

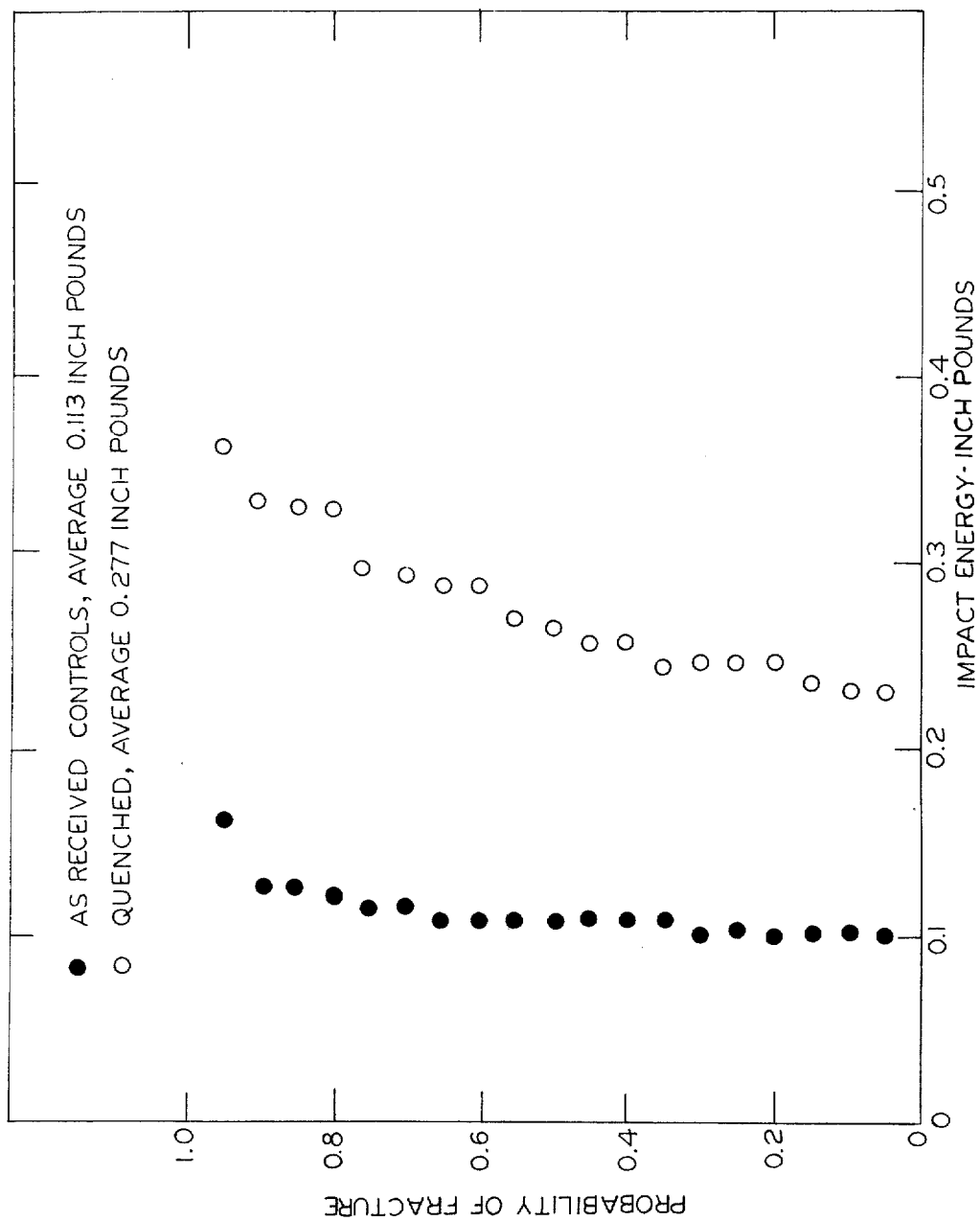

METHOD OF STRENGTHENING ALUMINA CERAMIC BY QUENCHING WITH LIQUID MEDIUM

This application is a continuation-in-part of application Ser. No. 131,595, filed Apr. 6, 1971 and now abandoned.

BACKGROUND OF THE INVENTION AND PRIOR ART

This invention relates to a method of strengthening polycrystalline alumina ceramic, and more particularly relates to a method of strengthening such alumina ceramic by quenching it with an oil, such as silicone oil, kerosene, and the like, and emulsions of oil and water.

By alumina ceramic is meant material which is substantially all alumina, such as 96% or 99% pure alumina, aswellas ceramic material in which the major portion is alumina, for example a 72% alumina — 28% chromia ceramic material. In the general discussion which follows, such materials will simply be designated as alumina.

The art has been aware for some time that polycrystalline ceramic materials can be thermally conditioned, that is, they can be fired and then placed in a stream of cool air to cool them more rapidly than they would be cooled if they were merely cooled with the kiln. The thermal conditioning generally increases the flexural strength and the impact strength somewhat. However, firing temperatures have been at the most about 1450°C., since at this temperature the forced air cooling seemed to cause a reduction in the modulus of rupture as compared with forced air cooling from lower firing temperatures, see Phillips et al, Thermal Conditioning of Ceramic Materials, American Ceramic Society Bulletin, Vol. 43, No. 1, Jan. 7, 1964. Moreover, the art has heretofore felt that in cooling in forced air, it was necessary to have a glassy intergranular phase, and that therefore thermal conditioning could not be applied to very high purity ceramic material.

SUMMARY OF THE INVENTION

It is an object of the present invention to provide a method of increasing the flexural and tensile strength and thermal shock and impact resistance of alumina which involves simply quenching the fired alumina body with a quenching medium which will quench it sufficiently quickly to greatly increase the strength thereof without causing the alumina body to fail due to thermal shock.

It is a further object of the present invention to provide a method of increasing the flexural and tensile strength and thermal shock and impact resistance of alumina which also improves the property of temperature dependence of strength of alumina.

It is a still further object of the invention to provide a method of increasing the flexural and tensile strength and thermal shock and impact resistance of alumina which involves simply quenching the alumina body with a quenching medium which is relatively inexpensive and yet which does not have serious adverse effects on the appearance of the alumina.

Applicants have found that alumina can be quenched with a liquid medium much more rapidly than by simply cooling in a stream of forced air, and that very surprisingly when the liquid medium is properly chosen and temperatures above those of the prior art are used, strengths which are much higher than those heretofore achieved by thermal conditioning can be achieved, and that this can be done without causing thermal shock damage by quenching with the liquid medium. In addition, the method is applicable even to very high purity alumina, and produces large improvements in the strength characteristics thereof.

This method according to the invention comprises refiring alumina up to temperatures from about 1400° to a temperature between 1700° and 1750°C, and then quenching the thus refired alumina with the liquid quenching medium which is at a temperature below about 250°C. One preferred method of carrying out the quenching step is by plunging the alumina into a liquid quenching medium. Alternatively, the alumina can be sprayed with the quenching medium.

The quenching medium is preferably an oil or an emulsion of an oil with water. By "oil" is meant mineral oil, petroleum base oil, such as motor oil; silicone oil; vegetable and animal and fish oils, such as corn oil, olive oil, castor oil, codliver oil, linseed oil and molten lard; and kerosene. The viscosity of such oils can be as low as 1.4 centistokes. The emulsions of these oils and water can have as little as 10% by weight of oil. In addition, such liquid media as triethanolamine and mixtures of water and emulsifier can be used.

By carrying out this method, the strength of the alumina, both the flexural strength and the tensile strength, is improved substantially over alumina which is merely allowed to cool in ambient air or is cooled in a stream of forced air at ambient temperature, yet the cooling is rapid, and the quenching medium is inexpensive and yet it has no deleterious effect on the alumina. In addition, the thermal shock and impact resistance are improved as compared with alumina which is simply refired and allowed to cool slowly.

Moreover, the method increases the strength of the alumina in such a way that the strength is maintained over long periods of time when the alumina is stored at room temperature, and the strength is also maintained over long periods of time at high temperatures.

BRIEF DESCRIPTION OF THE FIGURES

The invention will be described in greater detail in connection with the accompanying drawings, in which:

FIG. 8 is a graph of the flexural strength of alumina quenched according to the method of the invention and heated to various temperatures for various times;

FIG. 9 is a graph of the flexural strength of alumina quenched according to the method of the invention after various periods of time; and FIG. 10 is a graph of probability of fracture vs. impact energy for alumina quenched according to the method of the invention.

DETAILED DESCRIPTION OF PREFERRED EMBODIMENTS

Figure 1:
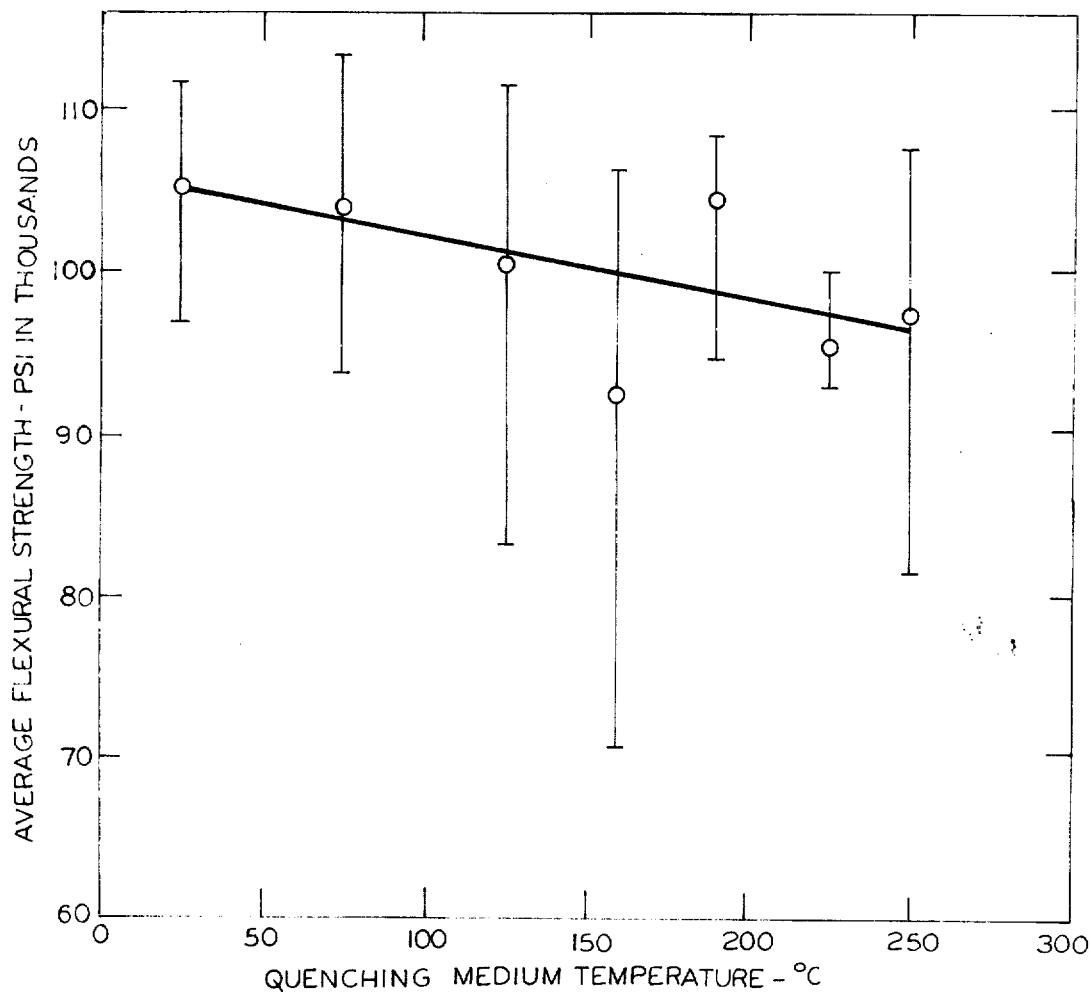
FIG. 1 is a graph of the flexural strength of alumina quenched according to the method of the invention vs. quenching medium temperature.

A preferred starting material for the method of the present invention is preferably polycrystalline alumina which is about 96% pure, the remainder being additions which are mostly silica, calcium amd magnesium oxide. However, the method is also applicable to polycrystalline alumina of higher purity, up to essentially 100% purity, and to such alumina in the form of solid solutions of alumina with other ceramic materials, such as $Cr_2O_3$, in which the major constituent is alumina. By "alumina" or "alumina ceramic" is meant not only single phase material, but also multi-phase material. The alumina is formed into the desired shape by, for example, hot pressing and then machining, after which it is ready for the application of the method according to the invention. The method has been successfully carried out on alumina ceramic having grains up to 50μm.

The body to be strengthened is refired at a temperature of from between 1700° and 1750°C to a temperature of 1400°C for a length of time sufficient to heat the body to the firing temperature throughout. Heating to a temperature above this has not been found to improve the strength further. It is preferable that the body being strengthened be fired for a time no longer than is necessary to bring the portion to be strengthened to the firing temperature. This is in order to avoid undesirable grain growth. For smaller bodies, shorter firing times at more extreme temperatures can be used than for larger bodies. Then it is quenched with the liquid quenching medium, such as by plunging it into the quenching medium or by spraying it with the quenching medium.

The quenching medium is preferably an oil or an emulsion of an oil with water. By "oil" is meant mineral oil; petroleum base oil, such as motor oil; silicone oil; vegetable and animal and fish oils, such as corn oil, olive oil, caster oil, codliver oil, linseed oil and molten lard; and kerosene. The viscosity of such oils can be as low as 1.4 centistokes. The emulsions of these oils and water can have as little as 10% by weight of oil. In addition, such liquid media as triethanolamine and mixtures of water and emulsifier can be used.

The quenching medium can be at a temperature ranging from about 250°C down. Higher temperatures of the quenching medium have been found to produce a smaller increase in strength. The effective viscosity of a low viscosity oil can be increased by agitating the oil until it is frothy.

An emulsion of silicone oil and water with an emulsifying agent, particularly where the amount of silicone oil is relatively low, even as low as 1% by weight, produces excellent improvements in the strength of 96% alumina and yet amazingly does not cause failure due to thermal shock. One advantage of using such an emulsion is that the alumina retains its white appearance after quenching, whereas it has a tendency to turn brown when quenched in silicone oil alone or a silicone oil and water emulsion which has a high percentage of silicone oil. A further advantage of using this type of quenching medium is that such a relatively small amount of silicone oil is used that the quenching medium is very inexpensive, especially where a large quantity is needed for quenching large bodies.

It has also found that because surface flaws can be points at which thermal shock failure starts, it is often advantageous and even necessary particularly in higher purity alumina, to polish the alumina to remove such flaws prior to the firing and quenching. Moreover where the bodies to be treated have sharp edges or corners at which stresses can concentrate, it is advantageous and often necessary, especially with the higher purity materials, to round off the sharp edges and corners.

The quenched alumina has many uses. Among them are such structures as radomes which are used to protect radar equipment, but which must pass high frequency electromagnetic waves. Ceramic cutting tools for use in machining metals and which have increased impact resistance as well as increased flexural strength are substantially improved when treated according to the method of the invention. The impact resistance of ceramic armor tiles is greatly increased when these tiles are treated according to the present method.

Specific examples will now be given to illustrate practical ways of carrying out the invention and the advantages achieved thereby. Where grain sizes are given, they are measured by the circular intercept method, unmodified by any factor. Where average strengths are given for the alumina bodies treated according to the present method, it will be understood that there are included in the average strengths certain bodies which have maximum strengths which sometimes are considerably above the average. Where these are pointed out, it is to indicate that such maximum strengths show the potential of the method when all conditions and materails are at the optimum. Moreover, merely because in some instances there are low strengths among the strengths making up the average or even failures of some specimens does not mean that the method is unreliable. In any commerical use of the method, the uncertainties in the strengths of the initial bodies being treated and in the treatment conditions and how such bodies will react to such conditions can be removed by such methods as proof testing to screen out all treated bodies having a strength below a predetermined minimum.

EXAMPLES 1-4

A plurality of rods of 96% alumina, ALSIMAG No. 614, product of American Lava Co., were prepared which were 0.125 in. in diameter and long enough to be tested by four point loading on a two inch span. The average grain size was on the order of 5-10 μm. The highest flexural strength for such rods which had been heated to about 1600°C and cooled in a stream of forced air at room temperature was about 71,100 psi.

A group of five such rods was heated to 1600°C for a time sufficient to enable the entire volume of material to reach the refiring temperature, and they were quenched into motor oil, SAE 30, at room temperature. A second group of 5 rods was heated in the same way to the same temperature and quenched in kerosene at room temperature (viscosity 1.4 to 1.9 centistokes). A third group of 3 rods was heated to 1500°C in the same way and also quenched in kerosene. A fourth group of rods was heated to 1600°C in the same way and quenched in water at room temperature.

The rods of the first three groups were tested for flexural strength by four point loading on a 2 inch span, and the resulting average flexural strengths were as shown in Table I. In each instance the strength is substantially greater than for quenching in forced air. All of the rods in the fourth group thermal shocked, and when tested in the same way had very little strength, as seen from the figures in Table 1.

EXAMPLES 5-12

Rods the same as those of Examples 1-4 were prepared and were divided into eight groups of five rods each. Each group of rods was heated to a firing temperature as shown in Table II for a time sufficient for the entire volume of the material to reach the firing temperature, and was then quenched into silicone oil having a viscosity of 100 centistokes at room temperature. The rods of Examples 5 and 6 were quenched in such silicone oil which was at room temperature, the rods of Examples 7-9 were quenched into such silicone oil which was at 160°C, and the rods of Examples 10-12 were quenched into such silicone oil which was at 250°C.

The quenched rods were then tested for flexural strength by four point loading on a two inch span, and the flexural strenghts were as shown in Table II. The best results were obtained for quenching from 1600°C into silicone oil at room temperature or at 160°C, the strongest samples in these groups having strengths greater than 107,000 psi. This is far greater than the strengths for alumina quenched in a stream of forced air.

EXAMPLES 13-21

The strength of the quenched alumina decreases as the temperature of the quenching medium increases. This is demonstrated by the following examples.

Alumina rods were prepared as in Examples 1-4, and divided into nine groups of five rods each. The rods of Examples 13-19 were fired to a temperature of 1550°C for a time sufficient for the entire volume of material to reach the firing temperature, and were then quenched in silicone oil having a viscosity of 100 centistokes. The oil was at various temperatures from room temperature to 250°C, as shown in Table III. The quenched rods were then tested for flexural strength by four point loading on a two inch span, and the average flexural strengths were as shown in Table III. The graph of FIG. 1 shows the flexural strengths plotted against the temperature of the quenching oil, with the range of strengths as well as the average also being shown. The gradual downward slope of the curve shows that the increasing temperature of the quenching medium results in reduced strengths of the quenched alumina. The strongest specimens in Examples 13, 14 and 15 were in the neighborhood of 113,000 psi.

The rods of Examples 20 and 21 were heated to 1600°C and were quenched in the same silicone oil at room temperature and at 160°C. Flexural strength tests gave average strengths of 105,400 psi for the rods quenched to room temperature, and 100,900 psi for the rods quenched to 160°C, thus confirming the results shown in FIG. 1.

EXAMPLES 22-23

Heating the 96% alumina to a temperature much higher than 1600°C does not appear to produce any further improvement in strength following quenching in silicone oil. Two groups of rods were prepared in the same manner as in Examples 1-4, and the first group was fired at 1650°C for a time sufficient to insure that the entire volume of material reached the firing temperature and was then quenched in silicone oil as used in Examples 5-12 and at room temperature. The second group was fired in the same way to 1700°C and also quenched in the same silicone oil at room temperature. No improvement in strength over the strengths observed in Examples 5-12 was observed when the quenched rods were tested for flexural strength as in Examples 5-12.

EXAMPLES 24-30

Firing the alumina at a temperature of less than 1400°C followed by quenching does not appear to produce improved strengths, as shown by the following examples.

Figure 2:
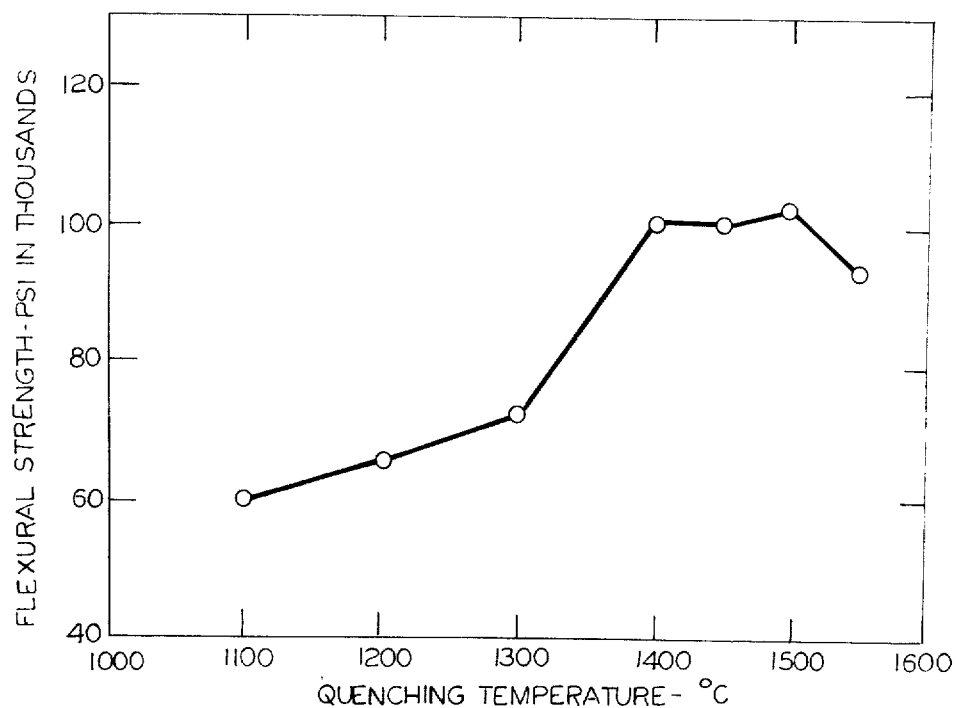
FIG. 2 is a graph of the flexural strength of alumina quenched according to the method of the invention vs. quenching temperature.

Alumina rods were prepared in the same manner as in Examples 1-4 and were divided into seven groups of five rods each. The rods of the various groups were fired at various temperatures from 1100° to 1550°C for a time sufficient to insure that the entire volume of the material reached the firing temperature, and then the rods were quenched in silicone oil having a viscosity of 100 centistokes, the oil being at room temperature. The rods were then tested for flexural strength by four-point loading on a two inch span, and the average strengths were as shown in Table IV. The strengths were plotted against the firing temperatures to obtain the curve shown in FIG. 2.

It can be seen that the curve rises sharply between 1300° and 1400°C, thus indicating that below 1400°C the firing and quenching does not produce any significant results.

EXAMPLES 31-37

Lower viscosity of the silicone oil results in higher strengths for the quenched 96% alumina, as shown by the following examples.

Alumina rods were prepared in the same manner as in Examples 1-4 and were divided into seven groups, the groups of Examples 31-34 and 37 having five rods, and the groups of Examples 35 and 36 having three rods. The rods were fired at various temperatures as shown in Table V for a time sufficient to insure that the entire volume of material reached the firing temperature, and were then quenched into silicone oil of various viscosities as shown in Table V, all of the oils being at room temperature.

The quenched rods were tested for flexural strength by four point loading on a two inch span, and the strengths were as shown in Table V, the strengths of the strongest samples from Examples 31 and 32 reaching upwards of 112,000 psi. It will be seen that the highest strengths were obtained from the silicone oils with the lowest viscosities.

EXAMPLES 38-44

Alumina rods were prepared in the same manner as in Examples 1-4 and were divided into seven groups, all of which had 5 rods therein except the group of Example 39, which had three rods. The rods were fired at various temperatures as indicated in Table VI for a time sufficeint to insure that all of the material of the rods reached the firing temperature, and then the rods were quenched in silicone oil having a viscosity of 100 centistokes at room temperature and emulsions of such silicone oil with various proportions of oil and water as indicated in Table VI. The silicone oil and emulsions were at room temperature. The emulsions were prepared by mixing the materials with 2.5 grams of oleic acid and 1.5 grams of morpholine for each 100 grams of oil and water.

The quenched specimens were tested for flexural strength by four point loading on a 2 inch span with the loads at the quarter points, and the average flexural strengths were shown in Table VI. These strengths are all substantially higher than the average strength of the as received control rods.

Even though the strengths were not as high as for some of the previous examples where the alumina was quenched in silicone oil only, several other points are of importance. First, despite the fact that water was present, to a substantial degree in the case of the 25% oil emulsion, no thermal shock failures were observed. Second, the emulsions were very frothy, and the specimens were all very white after quenching. This is in sharp contrast to the dark brown color which the specimens acquire when they are quenched in silicone oil only.

EXAMPLES 45–47

In order to determine the effect of the bubbles in the frothy emulsion on the strength of the quenched alumina, the following examples were carried out.

Alumina rods were prepared the same as in Examples 1–4 and were divided into three groups of five rods each. The emulsions in the same proportions as in Examples 40–44 were prepared and after agitation were allowed to settle for 2 days. They were then stirred gently to mix the ingredients again. The rods of the groups were fired at 1500°C for a time sufficient to insure that the entire volume of material was at the firing temperature and the rods were then quenched in the emulsions which were at room temperature. The quenched rods were then tested for flexural strength in the same manner as in Examples 38–44, and the average flexural strengths were as shown in Table VII.

It will be seen from Table VII that the strengths are on the order of those in Examples 38–44, so that the removal of the bubbles from the frothy emulsions did not have any effect on the increases in strength over that of the as received controls.

EXAMPLES 48–62

Emulsions of silicone oil and water with very low percentages of silicone oil can be used for the quenching medium according to the present invention with good results. Fifteen groups of three specimens each were prepared as in Examples 1–4, and the groups were divided into subgroups of three. The specimens of one group in each subgroup were heated to 1550°C, the specimens of a second group were heated to 1600°C, and the specimens of the third group were heated to 1650°C, all of the specimens being heated for 5 minutes to insure that the entire volume of the specimen was at the firing temperature.

Five emulsions of silicone oil (100 centistokes) and water were prepared by mixing silicone oil and water with an emulsifying agent in the same manner as in Examples 38–44, the ratios of silicone oil and water being as shown in Table VIII, and the specimens of the subgroups were quenched in the respective emulsions. The quenched specimens were then tested for flexural strength in the same manner as in the previous examples, and the average flexural strengths were as shown in Table VIII. It will be seen that by quenching from 1550°C into the 5% silicone oil emulsion, a maximum flexural strength in one of the specimens was 105,600 psi.

EXAMPLES 63–66

Further examples were carried out in which the amount of emulsifier was reduced in proportion to the dilution of the silicone oil, as set forth hereinafter.

Four emulsions were prepared by first preparing an emulsion of 50% silicone oil (100 centistokes) and 50% water with an amount of emulsifier as described in Examples 38–44, and then diluting the emulsion with water for forming 25%, 10%, 5% and 1% silicone oil emulsions, respectively. Four groups of specimens were prepared, each containing three specimens prepared as in Examples 1–4, and the specimens were heated to 1550°C for 5 minutes, and then the specimens of the groups were quenched in the respective emulsions. The resulting average flexural strengths were determined as in the previous examples, and were as shown in Table IX.

While the strengths were no greater than those obtained by the use of emulsions containing greater amounts of silicone oil, it was most amazing that the specimens did not fail by thermal shock. Moreover, the specimens were not stained brown as are the specimens quenched in silicone oil alone.

EXAMPLES 67–69

The alumina can also be strengthened by quenching it in a water-emulsifier mixture. A first quenching medium was prepared by adding 2.5 gms. of oleic acid and 1.5 gms. of morpholine to each 100 gms. of water, and a second quenching medium was prepared by diluting 400 cm$^3$ of such a quenching medium to 500 cm$^3$ by adding water. Three groups of specimens were prepared each with three specimens as in Examples 1–4, and the specimens of the first two groups were heated to 1600°C for 5 minutes and the third group was heated to 1500°C for 5 minutes. The first and third groups were quenched in the first quenching medium, and the quenched specimens were tested for flexural strength. The average flexural strengths were as shown in Table X. The specimens of the second group were quenched in the second medium and failed by thermal shock.

From these examples it can be seen that 96% alumina can be quenched in a water-emulsifier quenching medium having 4 gms. of emulsifier per 100 gms. of water for improving the flexural strength thereof without encountering failure by thermal shock.

EXAMPLES 70–73

Moderate refiring after the quenching does not appreciably reduce the strengths of the quenched alumina. This is shown by the following examples. Four groups of three alumina rods each were prepared as in Examples 1–4, and the rods in each group were heated to 1500°C as in the earlier examples, and were then quenched into silicone oil having a viscosity of 5.0 centistokes at room temperature. As shown from the data in Table XI, reheating followed by cooling has little effect on the strength.

EXAMPLE 74

Figure 3:
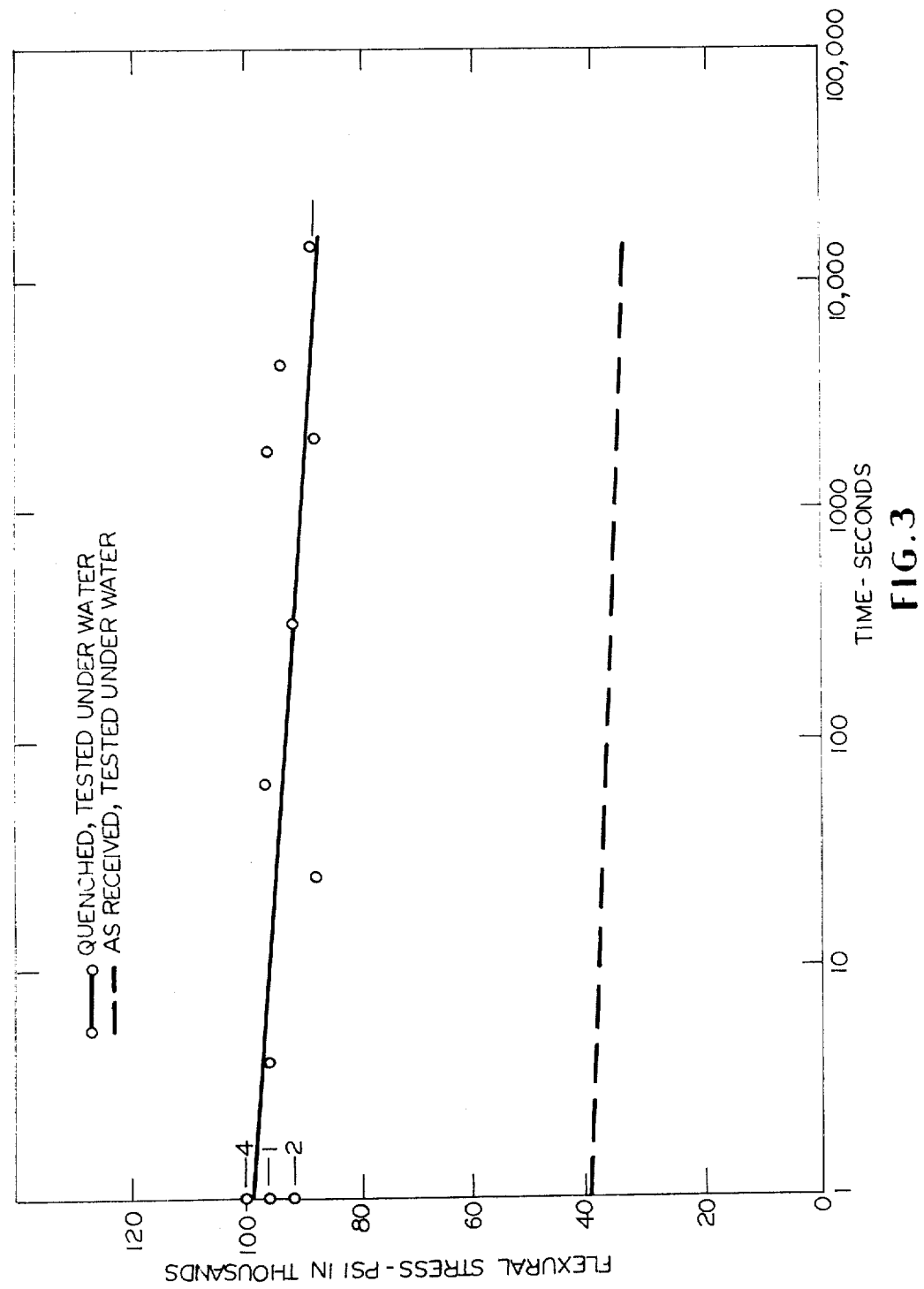
FIG. 3 is a graph of the flexural stress on alumina quenched according to the method of the invention vs. time.

Alumina rods the same as those in Examples 1–4 were quenched from 1600°C into silicone oil at room temperature and with a viscosity of 100 centistokes. The samples were tested for flexural strength under water by four point loading on a 2 inch span. The flexural strengths of the samples immediately after quenching was determined, and the strengths of the strongest were as given in the second column of Table XII. The rods were then loaded, still under water, at a load sufficient to give a flexural stress of 88,000 psi. The results of the delay fracture test were as shown in FIG. 3, in which the stress during the delayed fracture test is plotted against the time to fracture. The numbers over the small arrows on the left of the figure indicate the number of samples which failed in less than one second, and the number over the small arrow at the right of the figure indicates the number of samples which survived to 14,400 seconds.

A similar test was run on as received samples, and the data plotted on the graph of FIG. 3. The two curves, one for the quenched alumina specimens and the other for the as received controls show that the quenched specimens maintain their initial strength advantage.

In order to determine whether the samples were progressively weakened during the delayed fracture treatment, the flexural strength of the four samples which survived the test was determined in the same manner as was used to determine the initial strengths. The strengths were as given in the last column of Table XII. This shows that the short time strength was not decreased by the delayed fracture test.

EXAMPLES 75–79

In addition to improving the flexural strength, quenching improves the tensile strength, as shown in the following examples.

Two sets of specimens were prepared, each being rods of ALSIMAG No. 614 alumina, as used in Examples 1–4, having a diameter of 0.125 inch. in diameter and having a test section about 3.5 in. long. The specimens were then ground by placing them against a grinding wheel and then rotating the rods about their own axes to reduce the cross-section of the center thereof, and produce a necked down test specimen. The purpose of thus shaping the specimens was to avoid failure of the specimens in the groups of the testing apparatus.

The specimens were all heated to 1500°C until the entire volume of the material reached the firing temperature, and then four specimens were placed in still air at room temperature while the remaining five specimens were quenched in silicone oil at room temperature and having a viscosity of 12,500 centistokes.

The specimens were tested for tensile strength by potting the ends of the specimens in the grips of a tensile testing apparatus and testing for tensile strength. The results were as shown in Table XIII. The value of Example No. 78 cooled in still air was not included in the average.

It will be seen that the quenching in silicone oil substantially increases the tensile strength.

EXAMPLES 80–85

Quenching also improves the thermal shock resistance of alumina, as demonstrated by the following examples.

Figure 4:
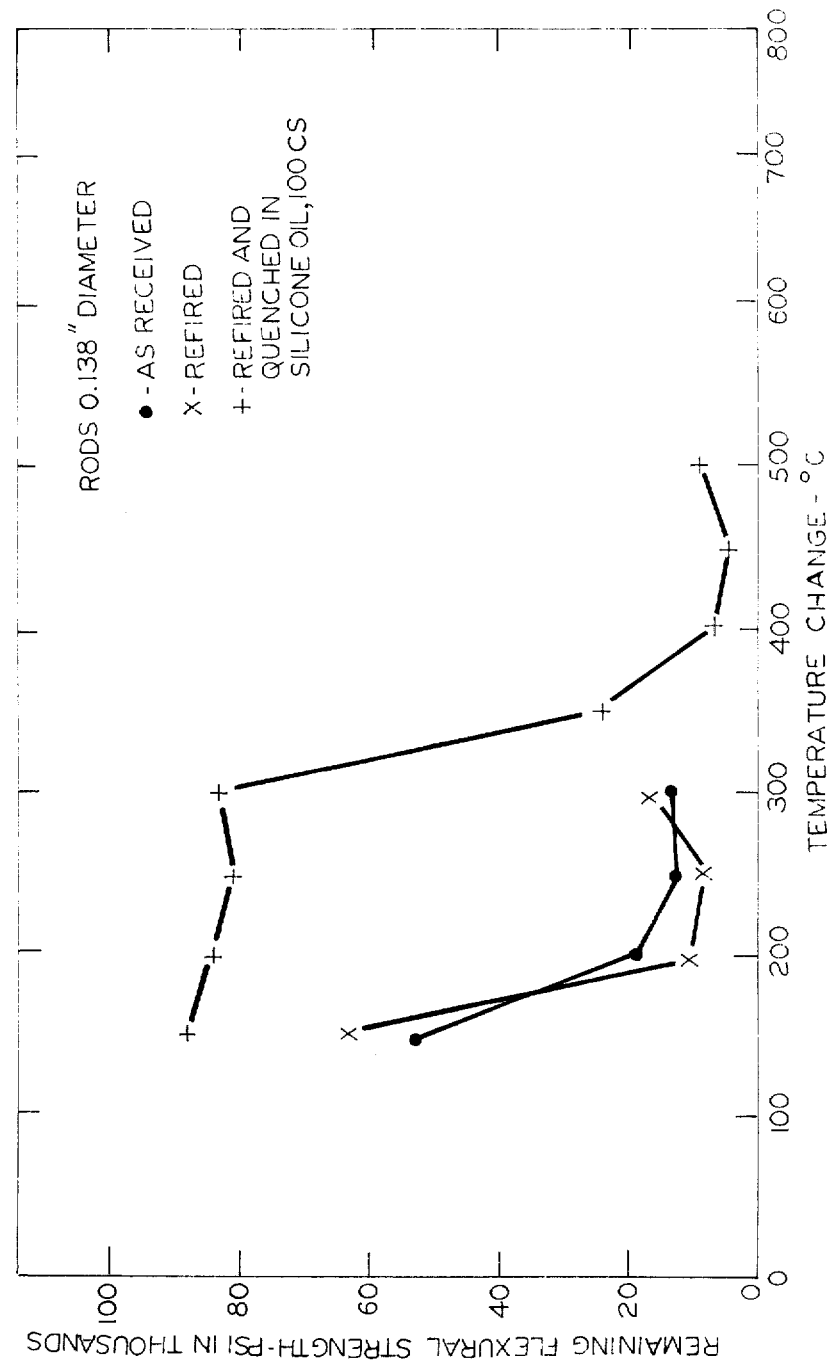
FIG. 4 is a graph of the flexural strength of alumina quenched according to the method of the invention and then tested for thermal shock resistance by being reheated and quenching in water.

Rods of 96% alumina were prepared in the same manner as in Examples 1–4, except that the diameter of the rods was 0.138 in. Four groups of rods of the material as received were reheated to 150°, 200°, 250° and 300°C, respectively, and were quenched in cold water in order to induce thermal shock damage. Four other groups of rods were refired at 1450°C and allowed to cool in ambient air, and were then reheated to the same temperatures and quenched in cold water. Eight groups of rods were refired to 1450°C, quenched in silicone oil of 100 centistokes viscosity and at room temperature, and were then reheated at the same temperatures and at 350°, 400°, 450° and 500°C, respectively. All of the rods were then tested for flexural strength by four point loading on a two inch span. The strengths of the rods remaining after one thermal shock cycle were as shown in Table XIV, and these strengths have been plotted in FIG. 4.

Figure 5:
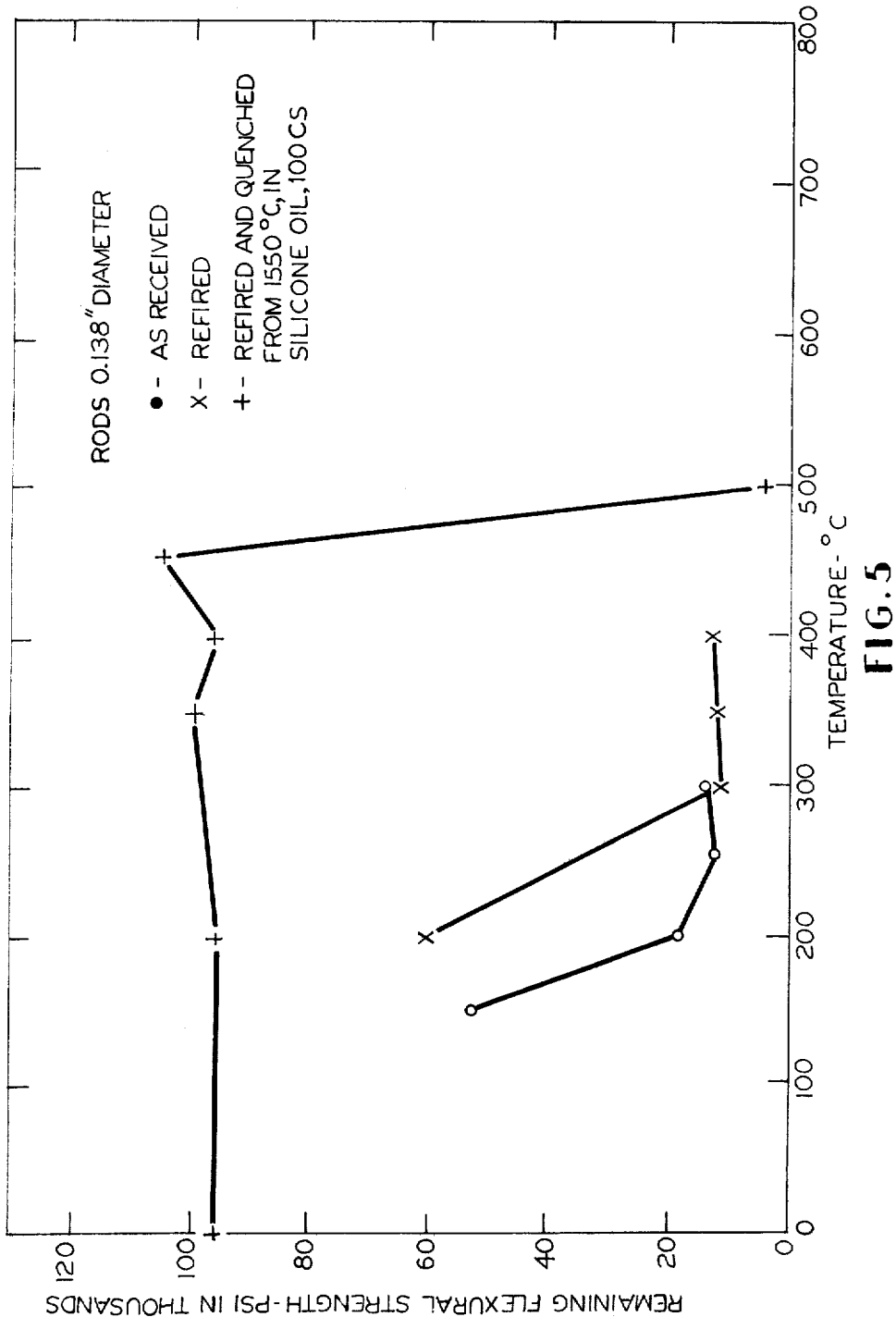
FIG. 5 is a graph similar to FIG. 4 for somewhat different conditions.

Like rods were prepared and the same treatments were used and the same tests were made, the only difference being that the firing temperature to which the rods were fired before quenching in silicone oil and before cooling in ambient atmosphere was 1500°C. The strengths of the rods were as shown in Table XIV and these strengths have been plotted in FIG. 5.

It will be seen that in both cases the thermal shock resistance increased substantially.

EXAMPLE 86

The 96% alumina retains its strength at elevated temperatures, as is shown by the following example.

Specimen rods of 96% alumina were prepared as in Examples 1–4 and were fired at 1500°C for 15 minutes, and then quenched in silicone oil at room temperature and with a viscosity of 100 centistokes. Groups of rods were then heated to various temperatures from room temperature up to 1100°C and were tested for flexural strength by four point loading on a 2 inch span. Like rods which had been simply fired and allowed to cool in ambient atmosphere and as receieved rods were heated to the same temperatures and likewise tested for flexural strength.

Figure 6:
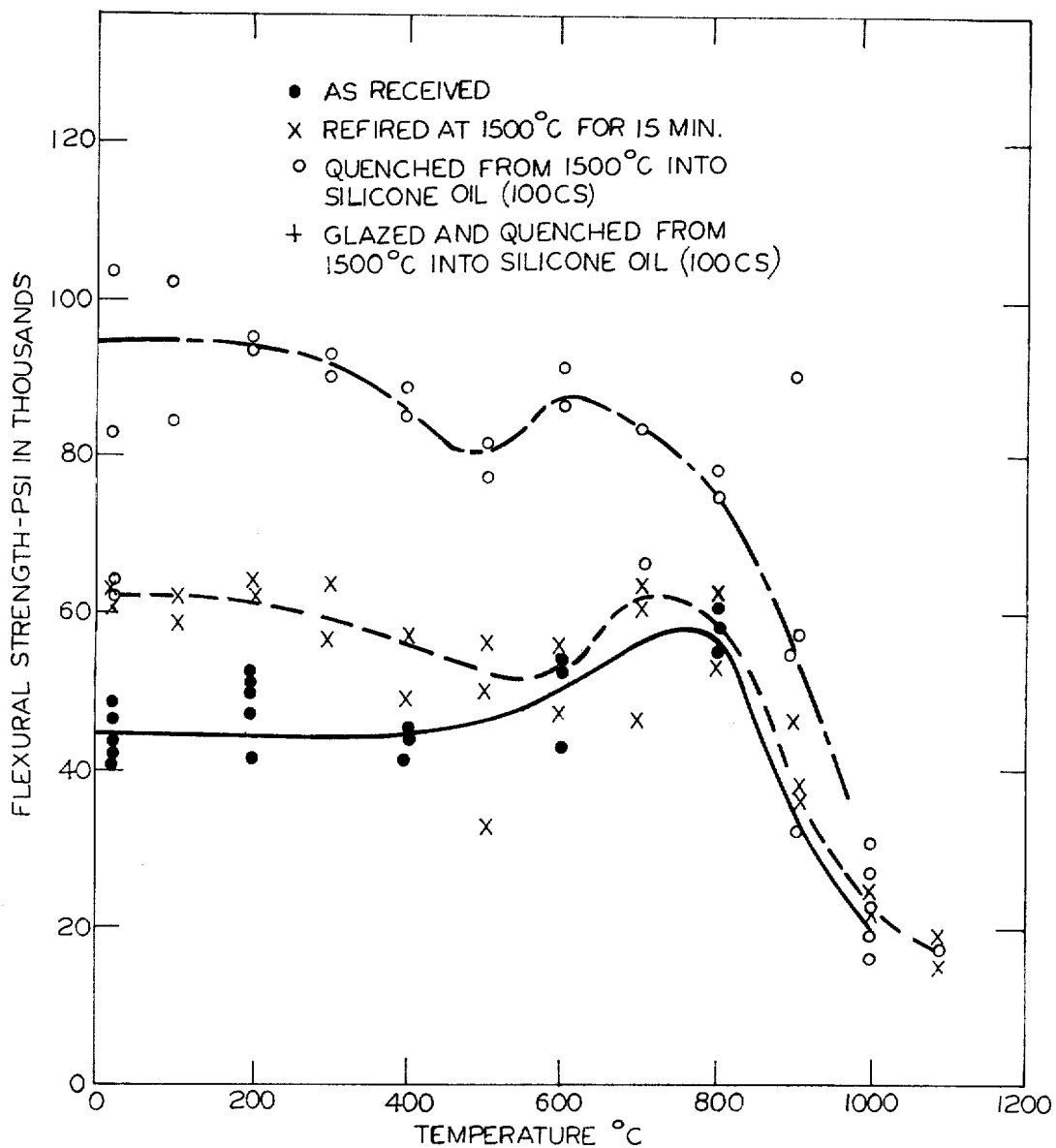
FIG. 6 is a graph of the flexural strength of alumina quenched according to the method of the invention vs. temperature at the time of testing.

The results of the flexural strength tests are shown in FIG. 6, from which it can be seen that the rods quenched in silicone oil retain their strength advantage at temperatures up to about 800°C, thus indicating that the increased strengths due to the quenching can be expected to remain even though the material is used in a high temperature environment.

EXAMPLE 87

Figure 7:
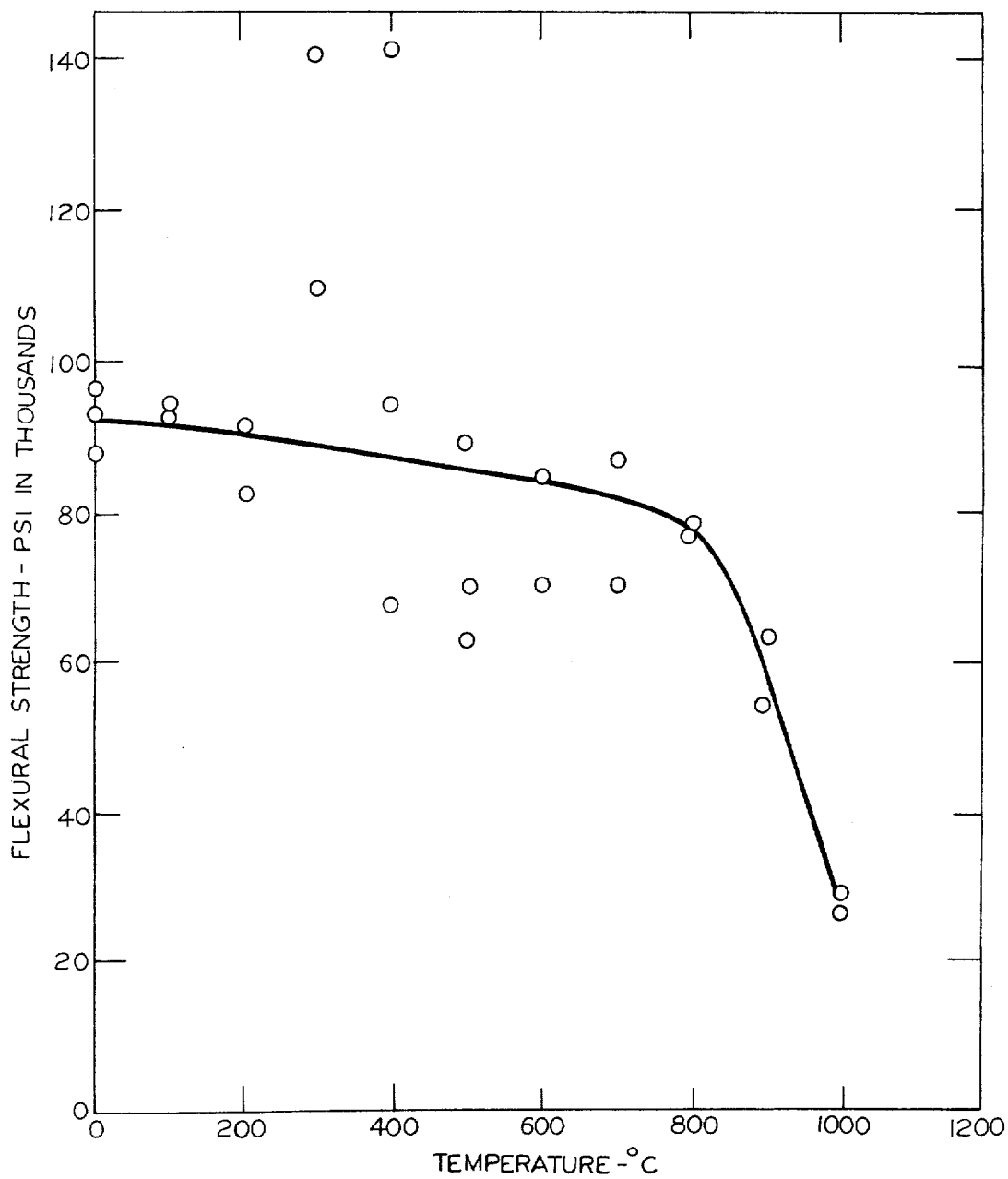
FIG. 7 is a graph similar to FIG. 6 for a similar test.

In order to verify the results obtained in Example 86, like specimens of the rods were prepared and heated and quenched in the same manner, and were then proof tested under an 88,000 psi flexural load in order to remove the weak specimens from among the treated specimens. The same flexural strength tests were then carried out as in Example 86, with the results as shown in FIG. 7. The curve has the same general shape as the curve for the silicone oil-quenched material in Example 86, and confirms that the strength advantage due to the unquenching is not lost at higher temperatures. The unusually high strengths between 200° and 400°C. are thought to be due to binding in the test fixture which was later diminished as the tests proceeded.

EXAMPLE 88

The strength due to the silicone oil-quenching treatment is retained even when the elevated temperatures are maintained for sometime, as shown by the present example.

Specimen rods were prepared in the same manner as in Examples 1–4 and were heated to 1500°C for 15 minutes and then quenched into silicone oil at room temperature having a viscosity of 100 centistokes. Thereafter, the rods were placed in a flexural strength testing fixture and held under a slight load of a few thousand pounds per square inch, the rods of one group being held at 850°C and the rods of the other group being held at 900°C., and the rods being held at these temperatures for various lengths of times. At the ends of the time periods the rods were tested for flexural strength as in the previous examples.

The results are shown in FIG. 8, from which it is seen that except for a few aberrations in the shorter times at 900°C, the specimens hold their strength even when kept at high temperatures for relatively extended lengths of time.

EXAMPLE 89

In order to show that the strength does not deteriorate over a period of time, the following example was carried out.

Groups of specimens prepared as in Examples 1–4 were treated by heating them to 1550°C and quenched in silicone oil at room temperature and having a viscosity of 100 centistokes. The specimens were then stored in the laboratory at ambient temperature and groups were tested for flexural strength by four point loading on a 2 inch span at intervals up to 290 days. The flexural strengths were as shown in FIG. 9, in which is also plotted the same data for as received control specimens. It will be seen that the strength does not deteriorate when the material which has been quenched is stored for a length of time under normal storage conditions. The average strength of the specimens immediately after treatment was 101,500 psi, while the average strength after 290 days was 101,800 psi, showing that the increase in strength is a stable property of the material.

EXAMPLE 90

The impact resistance of the material is also increased by the quenching of the material.

Specimen rods prepared as in Examples 1–4 were fired at 1500°C and quenched in silicone oil at room temperature and having a viscosity of 100 centistokes. The impact resistance of the rods was determined by an impact test in which a steel ball was dropped from progressively greater heights on the specimen supported across a hollow tube until the specimen failed. The impact strength was computed from the relationship between the cross sectional area of the specimen and the energy of the steel ball at the height causing failure of the specimen. In some instances the energy alone was used as the measure of the impact resistance.

The distribution curves for the impact energy necessary to cause failure in both the as received samples and the specimens of the example are shown in FIG. 10, from which it is clear that the impact resistance of the treated specimens is substantially greater than that of the as received controls.

EXAMPLES 91 and 92

The quenching has beneficial effects even when the alumina is present to a lesser extent than 96% in the ceramic material. Quenching a solid solution ceramic material of 72% $Al_2O_3$—28% $Cr_2O_3$ in silicone oil improved the flexural strength of that material.

Rods of such a solid solution which were 0.1 in. in diameter and 1.1 in. long were machined from larger pieces. The flexural strength of as machined rods was tested by four point loading on a one inch span, with the results as shown in Table XV. Like rods were fired to 1500°C until the entire volume of material was heated to the firing temperature, and then the rods were quenched in silicone oil of 12500 centistokes viscosity and at room temperature. The flexural strength of the quenched rods was tested in the same way, with the results as shown in Table XV. It is seen that the quenched rods had a substantially greater strength.

EXAMPLE 93

Specimen rods about 1.1 inches long and 0.125 in. in diameter were prepared from a material which was 72% $Al_2O_3$ and 28% $Cr_2O_3$ by pressure sintering at 1480°C and a pressure of 4000 psi. The finished rods were of a material which had an average grain size of 2.2$\mu$m, a bulk density of 4.28 gm/cm$^2$ (98.6% of theoretical density), and an open pore porosity of 0.6%. Specimen rods were packed in a powder which was a mixture of 72% $Al_2O_3$ and 28% $Cr_2O_3$ and were fired to 1500°C for 5 minutes, and were then quenched in silicone oil having a viscosity of 100 centistokes and at room temperature. The fired rods and the control rods were then polished by abrading them with silicon carbide paper, first with 400 grit paper, and then with 600 grit paper, and then with 15$\mu$m diamond paste until a high polish was obtained.

The control rods and the refired rods were then tested for flexural strength by four point loading on a one inch span, and the average strength for the refired and quenched rods was 112,500 psi with a maximum strength of 123,500 psi and a minimum of 105,800 psi. The average strength of the control rods was 81,500 psi with a maximum of 91,400 and a minimum of 79,300 psi.

EXAMPLE 94

Specimen rods about 0.12 in. in diameter and long enough to be tested by four point loading on a 1 inch span were prepared from a billet of CFC (Linde A + MgO) alumina. The billets were prepared by mixing Linde A alumina, which is substantially pure alumina, having a particle size of 0.3 $\mu$m, with 0.25% by weight of magnesium acetate dissolved in methanol to act as a grain growth inhibitor. After mixing the mixture in a blender, it was dried with constant agitation and then granulated through a 40 mesh screen. The powder was placed in a die and fired at 1425°C for 2 hours under 4000 psi pressure. The resulting billet had a bulk density of 99.4% of theoretical and an open pore pososity of 0.15%. The material had an average flexural strength of 91,000 psi.

First and second groups of the rods were heated at 1600°C and third and fourth groups were heated at 1700°C until the entire volume of the material in the specimens was at the firing temperature. The first and third groups of rods were quenched in silicone oil at room temperature and having a viscosity of 100 centistokes, and the second and fourth groups were quenched in silicone oil at room temperature and having a viscosity of 12,500 centistokes. The rods were then tested for flexural strength by four point loading on a 1 inch span, and the strengths were as shown in Table XVI.

Quenching into the lower viscosity of silicone oil from temperatures above 1600°C appears liable to cause thermal shock failure, particularly with the higher purity alumina material. Otherwise, the higher purity material is strengthened by the quenching treatment in the same manner as the lower purity material.

EXAMPLE 95

Specimen rods about 0.1 in. in diameter and 1.1 in. long were machined from billets of AVCO alumina, which is pressure sintered alumina 99.75% alumina and 0.25% MgO having a flexural strength as determined by four point loading on a one inch span of 84,500 psi. Seven groups of rods were fired at 1600°C for a time sufficient to insure that the entire volume of the rods was heated to the firing temperature, and then four groups were quenched in silicone oil at room temperature and having a viscosity of 12,500 centistokes, and the remaining three groups were quenched into silicone oil at room temperature and having a viscosity of 100 centistokes. Four more groups were fired in the same manner at 1700°C and quenched in silicone oil at room temperature and having a viscosity of 12,500 centistokes. The rods were then tested for flexural strength by four point loading on a one inch span, with the results as shown in Table XVII.

EXAMPLE 96

Specimen rods of CFC (A-16 + MgO) were prepared from Alcoa A-16 alumina powder and magnesium acetate in the same manner as the specimens in Example 91, except that the firing was at 1475°C for 2 hours. The bulk density was 98.6% of the theroetical and the open pore porosity was 0.06%, and the material had a flexural strength of 79,400 psi.

Rods 0.1 in. in diameter and slightly over one inch long were prepared by machining from the pressure sintered billet, and groups of the rods were heated to 1600° and 1700°C, respectively, and then quenched into silicone oil at room temperature and having a viscosity of 100 centistokes and 12,500 centistokes, respectively. The flexural strengths of the specimens quenched into the 100 centistoke oil from 1600°C had an average flexural strength when tested by four point loading on a 1 inch span of 74,700 psi, with an individual value of 94,500 psi. One specimen failed by thermal shock, and the others had fracture surfaces with very poor appearance and very rough fractures. The specimen quenched from 1700°C into the 100 centistoke oil failed by thermal shock.

The specimens quenched into 12,500 centistokes oil from 1700°C had an average flexural strength when tested by the same method of 95,500 psi, and those quenched from 1600°C han an average flexural strength of 110,700 psi.

EXAMPLE 97

Specimen rods about 0.13 in. in diameter and long enough to be tested by four point loading on a 1 inch span were prepared from a billet of CFC (Linde A + MgO) alumina. The billets were prepared by mixing Linde A alumina, which is substantially pure alumina, having a particle size of 0.3 m$\mu$, with 0.25% by weight of magnesium acetate dissolved in methanol to act as a grain growth inhibitor. After mixing the mixture in a blender, it was dried with constant agitation and then granulated through a 40 mesh screen. The powder was placed in a die and fired at 1475°C for 2 hours under 4000 psi pressure. The resulting billet had a bulk density of about 99.4% of theoretical and an open pore porosity of 0.15%. The specimens as machined had an average flexural strength of about 70,000 psi. The rods were then polished as described in Example 93, and the polished rods had a strength of about 100,000 psi.

Groups of the rods were heated to various temperatures ranging from 1450° to 1800°C (there was only 1 rod in the groups heated to 1450° and 1500°C) until the entire volume of the material in the specimens was at the firing temperature. The rods were then quenched in silicone oil at room temperature and having a viscosity of 12,500 centistokes. The rods were then tested for flexural strength by four point loading on a 1 inch span, and the strengths were as shown in Table XVIII.

These results show that the upper limit of firing for increasing the strength by the present method lies between 1700° and 1750°C.

EXAMPLE 98

Polished specimen rods about 0.135 in. in diameter were prepared as in Example 97 and were heated to 1700°C and held for about 3 minutes. Groups of three rods were quenched in silicone oil of various viscositites from 12,500 centistokes to 5 centistokes, as set forth in Table XIX, and were then tested for flexural strength by four point loading on a 1 inch span. The flexural strengths were as shown in Table XIX. This indicates that even high purity alumina can be quenched in relatively low viscosity silicone oil with very good results. The quenching in 100 centistoke oil produced a maximum flexural strength of 190,400 psi, one of the highest strengths ever observed by applicants for polycrystalline alumina.

EXAMPLE 99

In order to demonstrate the usefulness of various kinds of oils other than silicone oil and kerosene, a series of groups of five specimens each were prepared as in Example 1, and they were heated to 1500°C for a time sufficient to heat the specimens throughout. The groups of specimens were then quenched into various media as set forth in Table XX, all of which were at room temperature other than lard, which was at 100°C. The quenched rods were then tested for flexural strength by four point loading on a 2 inch span, with the results as shown. The maximum strengths achieved by quenching of the No. 1 specimens in linseed oil, cod liver oil, castor oil and lard are all quite high. The relatively low strengths for the No. 5 specimens in most of the groups can probably be attributed to low strength of the material from which the specimens were prepared.

EXAMPLE 100

Specimen rods about 0.13 in. in diameter and long enough to be tested by four point loading on a one inch span were prepared from a billet which was prepared from 100% Linde A alumina. The billets were prepared by forming the billet of Linde A alumina, having a particle size of 0.3 μm. The powder was placed in a die and fired at 1475°C for 2 hours under 4000 psi pressure. The resulting billet had a bulk density of about 3.97. The specimen rods were machined and then polished as described in Example 93, and four such polished rods had a strength of about 101,550 psi.

Three of the ground and polished rods were heated to 1550°C until the entire volume of the material in the specimens was at the firing temperature. The rods were then quenched in silicone oil at room temperature and having a viscosity of 100 centistokes. The rods were then tested for flexural strength by four point loading on a one inch span, and were found to have an average flexural strength of 124,750 psi.

EXAMPLE 101

Alumina rods were prepared in the same manner as in Examples 1–4 and were divided into three groups, all of which had 4 rods therein. The rods were fired at 1550°C for a time sufficient to insure that all of the material of the rods reached the firing temperature, and then the rods were quenched in emulsions of silicone oil having a viscosity of 100 centistokes and water with various proportions of oil and water as indicated in Table XXI. The emulsions were at room temperature. The emulsions of silicone oil and water were prepared by simply mixing the materials and mechanically agitating them. The emulsions remained stable for more than 1 hour. The emulsion to which an emulsifier was added had 3 gm. of stearic acid and 3 gm. triethanolamine for each 300 ml. of medium.

The quenched specimens were tested for flexural strength by four point loading on a two inch span with the loads at the quarter points, and the average flexural strengths were as shown in Table XXI. These strengths are all substantially higher than the average strength of the as received control rods, and are consistent with the results of quenching in emulsions with a different emulsifier. It is noted that the strengths for quenching in the emulsions without the emulsifier are slightly higher than for the emulsion where the emulsifier is used.

The results demonstrate that the presence of the emulsifier is not critical to the method, and that at emulsions with as little as 10% silicone oil, no emulsifier is needed.

TABLE I

Flexural Strength* of 96% Alumina Quenched Into Other Media
(Rods 0.125" diameter)

| Example No. | Quenching Medium | Quenching Temperatures °C. | No. Samples | Average Flexural Strength psi |
|---|---|---|---|---|
| 1 | Motor oil** at room temperature | 1600 | 5 | 102,100 |
| 2 | Kerosene at room temperature | 1600 | 5 | 87,100 |
| 3 | Kerosene at room temperature | 1500 | 3 | 90,600 |
| 4 | Water at room temperature | 1600 | 3 | 5,200*** |

*four point loading on a two inch span
**SAE 30
***all samples thermal shocked

TABLE II

Flexural Strength of 96% alumina Quenched From Various Temperatures Into Silicone Oil
(Rods 0.125" diameter, viscosity of oil 100 centistokes at room temperature)

| Example No. | Firing Temperature °C | Silicone Oil Temperature °C | No. Samples | Average Flexural Strength* psi |
|---|---|---|---|---|
| 5 | 1600 | Room Temperature | 5 | 105,400 (range 103,400 – 107,500) |
| 6 | 1650 | Room Temperature | 5 | 95,100 |
| 7 | 1500 | 160 | 5 | 88,300 |
| 8 | 1550 | 160 | 5 | 92,400 |
| 9 | 1600 | 160 | 5 | 105,400 (range 101,100 – 107,800) |
| 10 | 1500 | 250 | 5 | 93,300 |
| 11 | 1550 | 250 | 5 | 95,600 |
| 12 | 1600 | 250 | 5 | 95,000 |

*four point loading on a two inch span.

TABLE III

FLEXURAL STRENGTH OF 96% ALUMINA QUENCHED FROM VARIOUS TEMPERATURES INTO SILICONE OIL AT VARIOUS TEMPERATURES

| Example No. | Firing Temperature °C | Silicone Oil Temperature °C | No. Samples | Average Flexural Strength* psi |
|---|---|---|---|---|
| 13 | 1550 | Room Temperature | 5 | 105,000 (maximum 112,000) |
| 14 | 1550 | 75 | 5 | 104,000 (maximum 113,000) |

TABLE III — Continued

FLEXURAL STRENGTH OF 96% ALUMINA QUENCHED FROM VARIOUS TEMPERATURES INTO SILICONE OIL AT VARIOUS TEMPERATURES

| Example No. | Firing Temperature °C | Silicone Oil Temperature °C | No. Samples | Average Flexural Strength* psi |
|---|---|---|---|---|
| 15 | 1550 | 125 | 5 | 101,500 (maximum 112,000) |
| 16 | 1550 | 160 | 5 | 93,000 |
| 17 | 1550 | 175 | 5 | 105,000 |
| 18 | 1550 | 225 | 5 | 97,000 |
| 19 | 1550 | 250 | 5 | 98,500 |
| 20 | 1600 | Room Temperature | 5 | 105,400 |
| 21 | 1600 | 160 | 5 | 100,900 |

*four point loading on a two inch span

TABLE IV

Flexural Strength of 96% Alumina Quenched From Various Temperatures Into Silicone Oil at Room Temperature

| Example No. | Firing Temperature | No. Samples | Average Flexural Strength psi |
|---|---|---|---|
| 24 | 1100 | 5 | 60,000 |
| 25 | 1200 | 5 | 67,000 |
| 26 | 1300 | 5 | 73,000 |
| 27 | 1400 | 5 | 101,000 |
| 28 | 1450 | 5 | 100,000 |
| 29 | 1500 | 5 | 102,000 |
| 30 | 1550 | 5 | 95,000 |

TABLE V

FLEXURAL STRENGTH* OF 96% ALUMINA QUENCHED IN SILICONE OIL WITH VARIOUS VISCOSITIES, AT ROOM TEMPERATURE (RODS 0.125" DIAMETER)

| Example No. | Viscosity of Silicone Oil At Room Temperature | Quenching Temperature °C | No. Samples | Average Flexural Strength psi |
|---|---|---|---|---|
| 31 | 5.0 centistokes | 1550 | 5 | 103,100 (maximum 112,700) |
| 32 | 5.0 centistokes | 1600 | 5 | 105,600 (maximum 112,200) |
| 33 | 100 centistokes | 1550 | 5 | 105,200 |
| 34 | 100 centistokes | 1600 | 5 | 105,400 |
| 35 | 350 centistokes | 1600 | 3 | 86,000 |
| 36 | 1,000 centistokes | 1600 | 3 | 91,000 |
| 37 | 12,500 centistokes | 1550 | 5 | 86,100 |

*four point loading on a two inch span

TABLE VI

FLEXURAL STRENGTH OF 96% ALUMINA QUENCHED IN SILICONE OIL-WATER EMULSION (RODS 0.125" DIAMETER)

| Example No. | Treatment | Treatment Conditions Temp. °C | Time Hours | No. Specimens | Average Flexural Strength psi* |
|---|---|---|---|---|---|
| 38 | As Received | — | — | 5 | 58,300 |
| 39 | Quenched in Silicone Oil | 1500 | — | 5 | 94,100 |
| 40 | Quenched in Silicone Oil | 1600 | — | 3 | 92,500 |
| 41 | Quenched in Silicone Oil + 25% H₂O | 1500 | — | 5 | 71,900 |
| 42 | Quenched in Silicone Oil + 25% H₂O | 1550 | — | 5 | 89,600 |
| 43 | Quenched in Silicone Oil + 50% H₂O | 1450 | — | 5 | 86,400 |
| 44 | Quenched in Silicone Oil + 50% H₂O | 1500 | — | 5 | 81,600 |
|    | Quenched in Silicone Oil + 75% H₂O | 1500 | — | 5 | 89,600 |

*four point loading on a two inch span with loads at the quarter points

TABLE VII

FLEXURAL STRENGTH OF 96% ALUMINA QUENCHED IN SILICONE OIL-WATER EMULSION, BUBBLES REMOVED (RODS 0.125" DIAMETER)

| Example No. | Treatment | Treatment Conditions Temp. °C | Time Hours | No. Specimens | Average Flexural Strength psi |
|---|---|---|---|---|---|
| — | As Received Controls | — | — | 5 | 58,300 |
| 45 | Quenched in 75% Silicone Oil-25% Water | 1500 | — | 5 | 81,600 |
| 46 | Quenched in 50% Silicone Oil-50% Water | 1500 | — | 5 | 73,700 |
| 47 | Quenched in 25% Silicone Oil-75% Water | 1500 | — | 5 | 82,900 |

TABLE VIII

FLEXURAL STRENGTH OF 96% ALUMINA QUENCHED IN SILICONE OIL-WATER EMULSIONS (RODS 0.125" DIAMETER)

| Example No. | Treatment | Treatment Conditions Temp. °C | Time Hours | No. Specimens | Average Flexural Strength psi |
|---|---|---|---|---|---|
| 48 | Quenched in 75% Silicone Oil-25% Water | 1550 | 1/12 | 3 | 89,000 |
| 49 | Quenched in 75% Silicone Oil-25% Water | 1600 | 1/12 | 3 | 81,000 |
| 50 | Quenched in 75% Silicone Oil-25% Water | 1650 | 1/12 | 3 | 86,000 |
| 51 | Quenched in 50% Silicone Oil-50% Water | 1550 | 1/12 | 3 | 95,900 |
| 52 | Quenched in 50% Silicone Oil-50% Water | 1600 | 1/12 | 3 | 89,000 |
| 53 | Quenched in 50% Silicone Oil-50% Water | 1650 | 1/12 | 3 | 73,600 |
| 54 | Quenched in 25% Silicone Oil-75% Water | 1550 | 1/12 | 3 | 92,800 |
| 55 | Quenched in 25% Silicone Oil-75% Water | 1600 | 1/12 | 3 | 63,900 |
| 56 | Quenched in 25% Silicone Oil-75% Water | 1650 | 1/12 | 3 | 73,300 |
| 57 | Quenched in 15% Silicone Oil-85% Water | 1550 | 1/12 | 3 | 90,800 |
| 58 | Quenched in 15% Silicone Oil-85% Water | 1600 | 1/12 | 3 | 87,100 |
| 59 | Quenched in 15% Silicone Oil-85% Water | 1650 | 1/12 | 3 | 74,700 |
| 60 | Quenched in 5% Silicone Oil-95% Water | 1550 | 1/12 | 3 | 97,400 (105,600 maximum) |
| 61 | Quenched in 5% Silicone Oil-95% Water | 1600 | 1/12 | 3 | 92,200 |
| 62 | Quenched in 5% Silicone Oil-95% Water | 1650 | 1/12 | 3 | 80,300 |

TABLE IX

FLEXURAL STRENGTH OF 96% ALUMINA QUENCHED IN SILICONE OIL-WATER EMULSIONS - CONCENTRATION OF EMULSIFIERS DECREASED (RODS 0.125" DIAMETER)

| Example No. | Treatment | Treatment Conditions Temp. °C | Time Hours | No. Specimens | Average Flexural Strength psi |
|---|---|---|---|---|---|
| — | As Received Controls | — | — | 5 | 58,300 |
| 63 | Quenched in 25% Silicone Oil Emulsion | 1550 | 1/12 | 3 | 92,200 |
| 64 | Quenched in 10% Silicone Oil Emulsion | 1550 | 1/12 | 3 | 84,100 |
| 65 | Quenched in 5% Silicone Oil Emulsion | 1550 | 1/12 | 3 | 85,800 |
| 66 | Quenched in 1% Silicone Oil Emulsion | 1550 | 1/12 | 3 | 83,500 |

TABLE X

FLEXURAL STRENGTH OF 96% ALUMINA QUENCHED IN WATER PLUS EMULSIFIERS

| Example No. | Treatment | Treatment Conditions Temp. °C | Time Hours | No. Specimens | Average Flexural Strength psi |
|---|---|---|---|---|---|
| — | As Received Controls | — | — | 5 | 58,300 |
| 67 | Quenched in Water Plus Emulsifiers | 1600 | 1/12 | 3 | 88,800 |
| 68 | Quenched in 400 cm³ of above solution further diluted to 500 cm³ | 1600 | 1/12 | 3 | All failed by thermal shock |
| 69 | Quenched in Water Plus Emulsifiers | 1500 | 1/12 | 3 | 90,600 |

TABLE XI

FLEXURAL STRENGTH OF QUENCHES 96% ALUMINA REHEATED TO VARIOUS TEMPERATURES (RODS 0.125"DIAMETER)

| Example No. | Treatment | No. Samples | Average Flexural Strength psi |
|---|---|---|---|
| 70 | Quenched from 1500°C into silicone oil (5.0 centistokes) | 3 | 101,400 |
| 71 | Same as above, but refired to 500°C for one hour | 3 | 101,400 |
| 72 | Same as above, but refired to 800°C for one hour | 3 | 69,600 |
| 73 | Same as above, but refired to 1000°C for 15 minutes | 3 | 78,300 |

TABLE XII

FLEXURAL STRENGTH* OF 96% ALUMINA USED IN DELAYED FRACTURE TESTS (QUENCHED FROM 1600°C INTO SILICONE OIL, 100 CENTISTOKES AT ROOM TEMPERATURE, RODS 0.125" DIAMETER)

| | FLEXURAL STRENGTH PSI | |
|---|---|---|
| Sample No. | Quenched | Quenched, Survived Delayed Fracture Test for 14,400 seconds at 88,000 psi |
| 1 | 106,300 | 105,600 |
| 2 | 104,500 | 105,200 |
| 3 | 100,800 | 103,200 |
| 4 | 94,200 | 103,100 |
| 5 | — | failed |
| 6 | — | failed |
| Average | 101,400 | 104,300 |

*four point loading on a two inch span

TABLE XIII

TENSILE STRENGTH OF 96% ALUMINA

| | FLEXURAL STRENGTH - psi | |
|---|---|---|
| Example No. | Placed in Still Air | Quenched in Silicone Oil |
| 75 | 53,000 | 67,400 |
| 76 | 50,000 | 65,200 |
| 77 | 45,000 | 62,100 |
| 78 | 29,400* | 57,600 |
| 79 | — | 54,100 |
| Average | 49,500 | 61,300 |

*Result not included in average

TABLE XIV

THERMAL SHOCK TEST RESULTS FOR 96% ALUMINA

| | | | QUENCHED IN SILICONE OIL | |
|---|---|---|---|---|
| Example No. | | Initial Firing Temperature °C | Test Firing Temperature °C | Average Flexural Strength psi |
| 80 | As received | — | 150 | 53,000 |
| | | | 200 | 18,000 |
| | | | 250 | 12,000 |
| | | | 300 | 14,000 |
| 81 | Refired, Placed in Ambient Air | 1450 | 150 | 64,000 |
| | | | 200 | 9,000 |
| | | | 250 | 8,000 |
| | | | 300 | 16,000 |
| 82 | Refired, Quenched in Silicone oil | 1450 | 150 | 88,000 |
| | | | 200 | 84,000 |
| | | | 250 | 82,000 |
| | | | 300 | 83,000 |
| | | | 350 | 23,000 |
| | | | 400 | 6,000 |
| | | | 450 | 4,000 |
| | | | 500 | 8,000 |

TABLE XIV – Continued

THERMAL SHOCK TEST RESULTS FOR 96% ALUMINA

| | | QUENCHED IN SILICONE OIL | |
|---|---|---|---|
| Example No. | Initial Firing Temperature °C | Test Firing Temperature °C | Average Flexural Strength psi |
| 83 | As received | — | 150 | 52,000 |
| | | | 200 | 18,000 |
| | | | 250 | 12,000 |
| | | | 300 | 13,000 |
| 84 | Refired, Placed In Ambient Air | 1500 | 200 | 60,000 |
| | | | 300 | 10,000 |
| | | | 350 | 11,000 |
| | | | 400 | 12,000 |
| 85 | Refired, Quenched in Silicone Oil | 1500 | 0 | 97,000 |
| | | | 200 | 96,000 |
| | | | 350 | 99,000 |
| | | | 400 | 96,000 |
| | | | 450 | 103,000 |
| | | | 500 | 3,000 |

TABLE XV

FLEXURAL STRENGTH OF 72% $Al_2O_3$ – 28% $Cr_2O_3$ SOLID SOLUTION QUENCHED IN SILICONE OIL

| Example No. | Treatment | Flexural Strength psi | Average Flexural Strength Psi |
|---|---|---|---|
| 91 | As machined controls | 68,000 | 65,700 |
| | | 63,300 | |
| 92 | Refired to 1500°C, Quenched in Silicone oil, 12,500 centistokes | 78,700 | 76,000 |
| | | 75,900 | |
| | | 74,800 | |
| | | 74,600 | |

TABLE XVI

FLEXURAL STRENGTH OF CFC (LINDE A + MgO) PRESSURE SINTERED ALUMINA QUENCHED FROM VARIOUS TEMPERATURES INTO SILICONE OIL

| | FLEXURAL STRENGTH - psi | | | |
|---|---|---|---|---|
| Quenching Temperature - °C | 1,600 | 1,700 | 1,600 | 1,700 |
| Viscosity of Silicone Oil - cs. | 100 | 100 | 12,500 | 12,500 |
| Specimen No. | | | | |
| 1 | 124,100 | TSF* | 134,200 | 105,700 |
| 2 | 94,500 | — | — | — |
| Average | 109,300 | | | |

*TSF - Thermal Shock Failure

TABLE XVII

FLEXURAL STRENGTH OF AVCO PRESSURE SINTERED ALUMINA QUENCHED IN SILICONE OIL

| Specimen No. | As Machined | Quenched Into Silicone Oil 12500 cs. from 1600°C | Quenched Into Silicone Oil 12,500 cs. from 1700°C | Quenched Into Silicone Oil 100 cs. from 1600°C |
|---|---|---|---|---|
| 1 | 87,400 | 124,700 | 110,300 | 140,300 |
| 2 | 83,700 | 109,600 | 98,000 | 106,600 |
| 3 | 82,300 | 102,200 | 97,200 | 69,400 |
| 4 | — | 98,900 | 88,500 | — |
| Average | 84,500 | 108,800 | 98,500 | 105,400 |

TABLE XVIII

FLEXURAL STRENGTH OF CFC (LINDE A + MgO) PRESSURE SINTERED ALUMINA QUENCHED FROM VARIOUS TEMPERATURES INTO SILICONE OIL (12,500 cs.) (POLISHED RODS ~ 0.13" DIAMETER)

| | FLEXURAL STRENGTH - psi | | | | | | | |
|---|---|---|---|---|---|---|---|---|
| Quenching Temp. °C | 1450 | 1500 | 1550 | 1600 | 1650 | 1700 | 1750 | 1800 |

TABLE XVIII — Continued

FLEXURAL STRENGTH OF CFC (LINDE A + MgO) PRESSURE SINTERED ALUMINA QUENCHED FROM VARIOUS TEMPERATURES INTO SILICONE OIL (12,500 cs.) (POLISHED RODS — 0.13" DIAMETER)

| Specimen No. | | | FLEXURAL STRENGTH - psi | | | | | |
|---|---|---|---|---|---|---|---|---|
| 1 | 106,800 | 121,400 | 160,300 | 104,300 | 136,500 | 139,200 | 101,900 | 67,300 |
| 2 | — | — | 136,500 | 102,300 | 116,400 | 121,400 | 84,000 | TSF* |
| 3 | — | — | 131,600 | 96,300 | 96,140 | 116,600 | 75,500 | TSF |
| 4 | — | — | 124,100 | 94,700 | — | TSF | VF** | TSF |
| 5 | — | — | 111,300 | — | — | — | — | — |
| 6 | — | — | 102,900 | — | — | — | — | — |
| Average | 106,800 | 121,400 | 127,800 | 99,400 | 116,300 | 125,700 | 87,100 | 67,300 |

*Thermal Shock Failure
**Visible Flaw

TABLE XIX

FLEXURAL STRENGTH OF CFC (LINDE A + MgO) PRESSURE SINTERED ALUMINA QUENCHED FROM 1700°C INTO SILICONE OIL OF VARIOUS VISCOSITIES (ROD DIAMETER~0.135", POLISHED)

| | FLEXURAL STRENGTH - psi | | | | |
|---|---|---|---|---|---|
| Viscosity | 12,500 cs. | 1,000 cs. | 350 cs. | 100 cs. | 5 cs. |
| Specimen No. | | | | | |
| 1 | 132,200 | 133,600 | 152,800 | 190,400 | 120,900 |
| 2 | 131,300 | 130,300 | 149,900 | 181,000 | 100,500 |
| 3 | 115,900 | 130,000 | 108,900 | 160,700 | TSF |
| Average | 124,500 | 131,300 | 137,200 | 177,400 | 110,700 |

TABLE XX

FLEXURAL STRENGTH OF 96% ALUMINA QUENCHED FROM 1500°C INTO VARIOUS MEDIA (RODS 0.125" DIAMETER)

| | FLEXURAL STRENGTH - psi | | | | | | |
|---|---|---|---|---|---|---|---|
| Quenching Medium | Corn Oil | Olive Oil | Castor Oil | Cod Liver Oil | Linseed Oil | Triethanolamine | Lard at 100°C |
| Specimen No. | | | | | | | |
| 1 | 102,500 | 110,000 | 107,600 | 111,700 | 122,300 | 90,200 | 105,500 |
| 2 | 94,700 | 102,300 | 102,200 | 99,600 | 118,600 | 88,500 | 100,500 |
| 3 | 84,700 | 100,400 | 97,800 | 92,100 | 104,400 | 86,700 | 96,200 |
| 4 | 64,700 | 85,600 | 96,900 | 83,400 | 95,800 | 83,400 | 89,500 |
| 5 | 37,400 | 63,600 | 94,400 | 40,500 | 30,400 | 71,600 | 78,800 |
| Average | 76,800 | 92,400 | 99,800 | 85,400 | 94,300 | 84,100 | 94,100 |

TABLE XXI

Flexural Strength* of 96% Alumina Rods Quenched from 1550°C into Emulsions (0.125 in. diameter rods)

| Quenching Medium | As Received Controls | 75% Silicone Oil** 25% Water No emulsifier | 10% Silicone Oil 90% water No emulsifier | 75% Silicone Oil 25% Water Emulsifier 3 gm stearic acid 3 gm triethanolamine in 300 ml of medium |
|---|---|---|---|---|
| Specimen No. | | | | |
| 1 | 59,600 | 96,400 | 96,900 | 90,700 |
| 2 | 56,900 | 87,600 | 94,300 | 81,200 |
| 3 | 53,300 | 83,700 | 91,300 | 76,200 |
| 4 | 53,100 | 70,200 | 89,100 | 74,200 |
| Average | 55,700 | 84,500 | 92,900 | 80,600 |

*four point loading on a two inch span
**100 centistokes

What is claimed is:

1. A method of strengthening a polycrystalline alumina ceramic, comprising the steps of refiring an unglazed body consisting essentially of alumina ceramic having a grain size up to 50μm to a temperature of from 1400°C to between 1700° and 1750°C for a time sufficient to heat the body to be strengthened throughout, and quenching the body with a liquid medium which is at a temperature below about 250°C and no lower than room temperature and which is a medium taken from the group consisting of oils having a viscosity as low as 1.4 centistokes, said oils being mineral oil, petroleum oil, vegetable oil, and animal oil and emulsions of such oils in water with as little as 10% by weight of oil, whereby the flexural strength, tensile strength, impact resistance and thermal shock resistance is improved.

2. A method as claimed in claim 1 in which the quenching medium is kerosene.

3. A method as claimed in claim 1 in which the quenching medium is fish oil.

4. A method as claimed in claim 1 in which the quenching medium is an emulsion of silicone oil having a viscosity of 100 centistokes and water.

5. A method as claimed in claim 1 in which the alumina ceramic is a ceramic material of 72% $Al_2O_3$ and 28%l $Cr_2O_3$, and the quenching medium is silicone oil having a viscosity of at least 100 centistokes.

6. A method as claimed in claim 1 in which the alumina ceramic has greater than 96% alumina, further comprising the step of, prior to the refiring step, polishing the body of ceramic for removing surface flaws.

7. A method as claimed in claim 6 in which the body has at least one sharp edge or corner, further comprising the step of rounding off the sharp edge or corner prior to the refiring step.

8. A method as claimed in claim 1 in which the body or alumina ceramic has at least one sharp edge or corner, further comprising the step of, prior to the refiring step, rounding off the sharp edge or corner.

9. A method as claimed in claim 1 in which the alumina ceramic is 96% alumina and the liquid medium is SAE30 motor oil.

10. A method as claimed in claim 1 in which the alumina is 96% alumina and the liquid medium is silicone oil having a viscosity of from 5 to 12,500 centistokes.

11. A method as claimed in claim 1 in which the alumina is 72% $Al_2O_3$ and 28 percent $Cr_2O_3$, and the liquid medium is silicone oil having a viscosity of 12,500 centistokes.

12. A method as claimed in claim 1 in which the alumina is 99.75% alumina, and the liquid medium is silicone oil having a viscosity of from 100 to 12,500 centistokes.

13. A method of strengthening a polycrystalline alumina ceramic having a grain size up to 50μm, comprising the steps of, where necessary to remove surface flaws where thermal shock failure can start, polishing an unglazed body consisting essentially of alumina ceramic to be strengthened, refiring the polished body to a temperature of from 1400°C to between 1700 and 1750°C for a time sufficient to heat the body to be strengthened throughout, and quenching the body with a liquid medium which is at a temperature below about 250°C and no lower than room temperature and which is a medium taken from the group consisting of oils having a viscosity as low as 1.4 centistokes, said oils being mineral oil, petroleum oil, vegetable oil, and animal oil, and emulsions of such oils in water with as little as 10% by weight of oil, whereby the flexural strength, tensile strength, impact resistance and thermal shock resistance is improved.

14. A method as claimed in claim 13 further comprising where the body has a sharp edge or corner, rounding off the sharp edge or corner prior to the refiring step.

15. A method as claimed in claim 13 in which the alumina is 72% $Al_2O_3$ and 28% $Cr_2O_3$, the body is polished prior to refiring, and the liquid medium is silicone oil having a viscosity of 100 centistokes.

16. A method as claimed in claim 13 in which the alumina is from 99.75 to 100% alumina, the body is polished prior to refiring, and the liquid medium is silicone oil having a viscosity as low as 5 centistokes.

17. A method of strengthening a polycrystalline alumina ceramic, comprising the steps of refiring an unglazed body of alumina ceramic having a grain size up to 50μm to a temperature of from 1400°C to between 1700 and 1750°C for a time sufficient to heat the body to be strengthened throughout, and quenching the body with triethanolamine at a temperature no higher than the boiling point thereof, whereby the flexural strength, tensile strength, impact resistance and thermal shock resistance is improved.

18. A method of strengthening a polycrystalline alumina ceramic, comprising the steps of refiring an unglazed body consisting essentially of alumina ceramic having a grain size up to 50μm to a temperature of from 1400°C to between 1700 and 1750°C for a time sufficient to heat the body to be strengthened throughout, and quenching the body with a mixture of oleic acid, morpholine and water at a temperature no higher than 100°C, there being a total of 4 gms. oleic acid and morpholine per 100 gms. of water, whereby the flexural strength, tensile strength, impact resistance and thermal shock resistance is improved.

* * * * *